United States Patent
Iszlai et al.

(10) Patent No.: US 9,866,451 B2
(45) Date of Patent: Jan. 9, 2018

(54) DEPLOYMENT OF ENTERPRISE APPLICATIONS

(71) Applicant: International Business Machines Corporation, Armonk, NY (US)

(72) Inventors: Gabriel I. Iszlai, Pickering (CA); Jun Jie Nan, Beijing (CN); Hong Jun Tu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 14/728,172

(22) Filed: Jun. 2, 2015

(65) Prior Publication Data

US 2016/0359692 A1 Dec. 8, 2016

(51) Int. Cl.
*H04L 12/24* (2006.01)
*H04L 29/12* (2006.01)

(52) U.S. Cl.
CPC ........ *H04L 41/5054* (2013.01); *H04L 41/145* (2013.01); *H04L 61/2015* (2013.01)

(58) Field of Classification Search
CPC H04L 41/5054; H04L 41/145; H04L 61/2015
USPC ....................................................... 709/226
See application file for complete search history.

(56) References Cited

U.S. PATENT DOCUMENTS

| | | |
|---|---|---|
| 2006/0174238 A1* | 8/2006 | Henseler .................. G06F 8/63 717/168 |
| 2011/0283194 A1 | 11/2011 | Chen et al. |
| 2012/0185821 A1 | 7/2012 | Yaseen et al. |
| 2013/0232480 A1 | 9/2013 | Winterfeldt et al. |
| 2014/0040656 A1 | 2/2014 | Ho et al. |

OTHER PUBLICATIONS

Benson, et al., "CloudNaaS: A Cloud Networking Platform for Enterprise Applications", SOCC'11, Oct. 27-28, 2011, Cascais, Portugal, Copyright 2011, ACM, 978-1-503-0976—Sep. 11, 2010, pp. 1-13.

(Continued)

*Primary Examiner* — Tu Nguyen
(74) *Attorney, Agent, or Firm* — James H. Mayfield

(57) ABSTRACT

A method, executed by a computer, for deploying an enterprise application includes configuring a plurality of application nodes for a software defined network using static IP addresses, capturing a plurality of images corresponding to the plurality of application nodes, preparing an application pattern that incorporates the plurality of images, and saving the application pattern for subsequent deployment. In one embodiment, the application is deployed onto a computing environment using the application pattern. The software defined network may be accessible by one or more service IP address. In one embodiment, one or more of the application nodes functions as a cloud computing software platform, such as an infrastructure-as-a-service (IaaS) solution. The software defined network may be an isolated virtual network. A computer program product and computer system corresponding to the methods are also disclosed herein.

17 Claims, 7 Drawing Sheets

(56) References Cited

OTHER PUBLICATIONS

Buyya et al., "Platforms for Building and Deploying Applications for Cloud Computing", Cloud Computing and Distributed Systems (CLOUDS) Laboratory, Dept. of Computer Science and Software engineering, The University of Melbourne, Parkville, VIC 3010, Australia, pp. 6-11, CSI Communications, May 2011, <Platforms for Building and Deploying.pdf>.

Fehling et al., "Cloud Computing Patterns: Fundamentals to Design, Build and Manage Cloud Applications", Spring Publishing Company, Incorporated © 2014, ISBN: 3709115671 9783709115671, pp. 1-3.

\* cited by examiner

DEPLOYMENT OF ENTERPRISE APPLICATIONS

BACKGROUND OF THE INVENTION

The present invention relates generally to software deployment, and more specifically, to deploying enterprise applications.

Enterprise applications tend to be more complex and require a greater degree of diligence to install and configure than consumer applications. Thus, cloud-based enterprise applications tend to be more expensive and less scalable than traditional consumer applications, particularly those that have been designed with cloud architecture in mind.

Furthermore, running enterprise applications on a cloud platform is difficult because the applications may run as a cluster across multiple nodes. Configuring each node to operate properly, particularly in conjunction with other nodes, may require considerable time. Thus, it is challenging to deploy an enterprise application onto a cloud platform in a manner that minimizes the duration or complexity of installation and configuration.

SUMMARY

As disclosed herein, a method, executed by a computer, for deploying an enterprise application includes configuring a plurality of application nodes for a software defined network using static IP addresses, capturing a plurality of images corresponding to the plurality of application nodes, preparing an application pattern that incorporates the plurality of images, and saving the application pattern for subsequent deployment. In one embodiment, the application is deployed onto a computing environment using the application pattern. The software defined network may be accessible by one or more service IP address. In one embodiment, one or more of the application nodes function as a cloud computing software platform, such as an infrastructure-as-a-service (IaaS) solution. The software defined network may be an isolated virtual network. A computer program product and computer system corresponding to the above method are also disclosed herein.

DETAILED DESCRIPTION

Embodiments of the present invention relate generally to deploying an application, and more specifically, to deploying enterprise applications on a cloud platform. An enterprise application may exist on a cloud platform as a cluster of nodes functioning together. When an application has multiple nodes, the installation process can be quite complicated and time-intensive, as it is necessary to configure each node to function individually and collectively with the other nodes.

One approach to streamlining installation and configuration is to execute scripts that automate the many steps involved in installing and configuring nodes. However, a script may only run on the operating system for which it was designed. The present invention provides a universal solution by using images of pre-configured nodes to rapidly deploy a fully-functioning enterprise application.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter.

Figure 1:
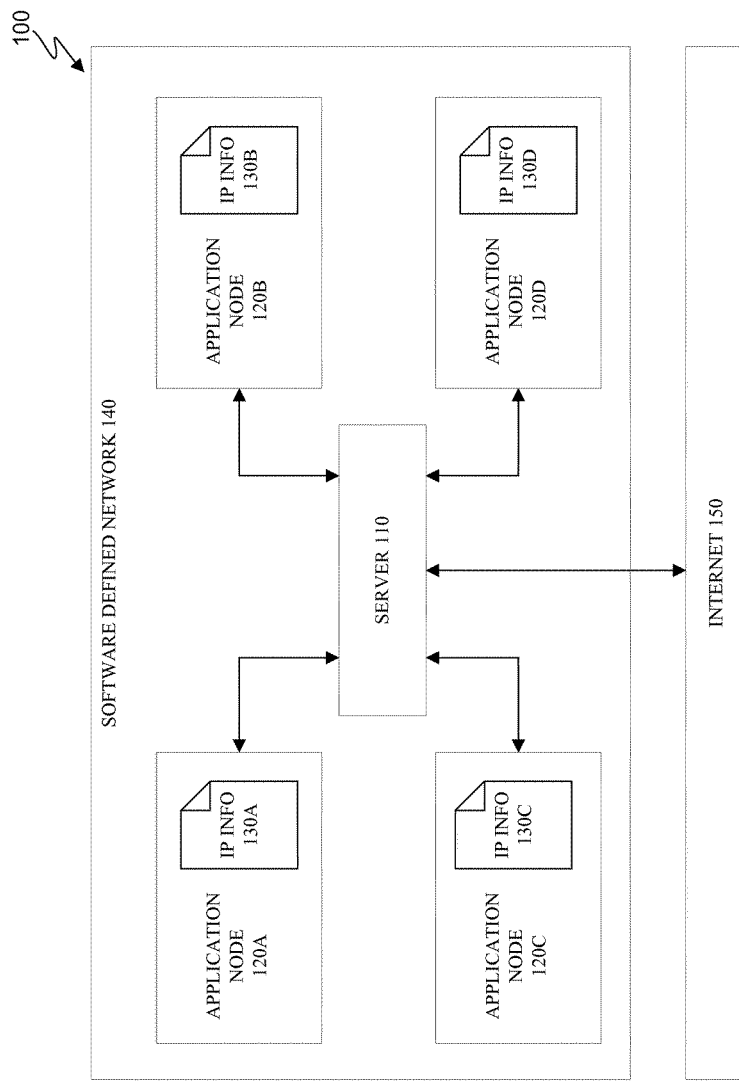
FIG. 1 is a block diagram of one embodiment of an application in accordance with the present invention.

FIG. 1 is a block diagram of one embodiment of an application environment 100 in accordance with the present invention. As depicted, the application environment 100 includes a server 110 and application nodes 120 running on a software defined network 140. Each application node 120 (e.g., 120A-120D) has corresponding IP information 130 (e.g., 130A-130D). The software defined network 110 may be connected to another network or inter-network, such as the internet 150. Together, the application nodes 120 may form a clustered system capable of running applications.

The application nodes 120 may perform the various functions that enable an application to execute properly. By spreading an application across multiple application nodes 120, the application's tasks and responsibilities may be subdivided and parallelized in order to optimize the application and provide the application with necessary computing resources. In certain embodiments, each application node 120 is an instance of a process associated with the application. The application nodes 120 may represent various levels of abstraction of the application. For example, in one embodiment, an application node 120 may host multiple tenants or processes via multi-tenancy, virtualization, or the like. One or more of the nodes may function as a cloud computing software platform, such as an infrastructure-as-a-service (IaaS) solution. In a particular embodiment, one or more of the nodes runs Openstack®. The IP information 130 may be associated with each node 120. In certain embodiments, the IP information 130 provides the IP addresses necessary for an application node 120 to find other network members. For example, IP information 130A may enable application node 120A to find application nodes 120B, 120C, 120D, and/or the server 110. In some embodiments, the IP addresses of some or all of the application nodes 120 are static IP addresses.

The server 110 may be used to serve the requests of the application nodes 120 and to link the application to external networks and devices. In certain embodiments, the server 110 is a central hub through which the application nodes 120 communicate. The server 110 may store its own IP information 130, enabling the application nodes 120 to communicate with each other without the need for their own copies of the IP information 130. In some embodiments, the server 110 enables the application nodes 120 to connect to external networks, such as an intranet or the Internet 150. The application nodes 120 may be accessed externally via a service IP address associated with the server 110. In some embodiments, the service IP address enables a direct connection to one of the application nodes 120. Whereas the application nodes 120 may be assigned static IP addresses, the service IP address may belong to another subnet of addresses and may be dynamically assigned by a server 110 or DHCP server during the configuration stage or deployment stage.

The components of the application communicate over a software defined network 140. In some embodiment, some or all of the members of the software defined network are configured to use static IP addresses. In certain embodiments, the use of static IP addresses enables the various application nodes 120 to communicate with each other without requiring a server 110 as an intermediary. The software defined network 140 may also be an isolated virtual network inside of another network. In embodiments in which the software defined network 140 is an isolated virtual network, IP address conflicts between members of the software defined network 140 and external networks are avoided by employing approaches that enable IP overlap. For example, the IP addresses assigned to nodes 120 in the software designed network 140 may be internally consistent, and translated by the server 110 into another set of IPs belonging to a different, non-conflicting subnet in order to avoid IP conflicts.

Figure 2:
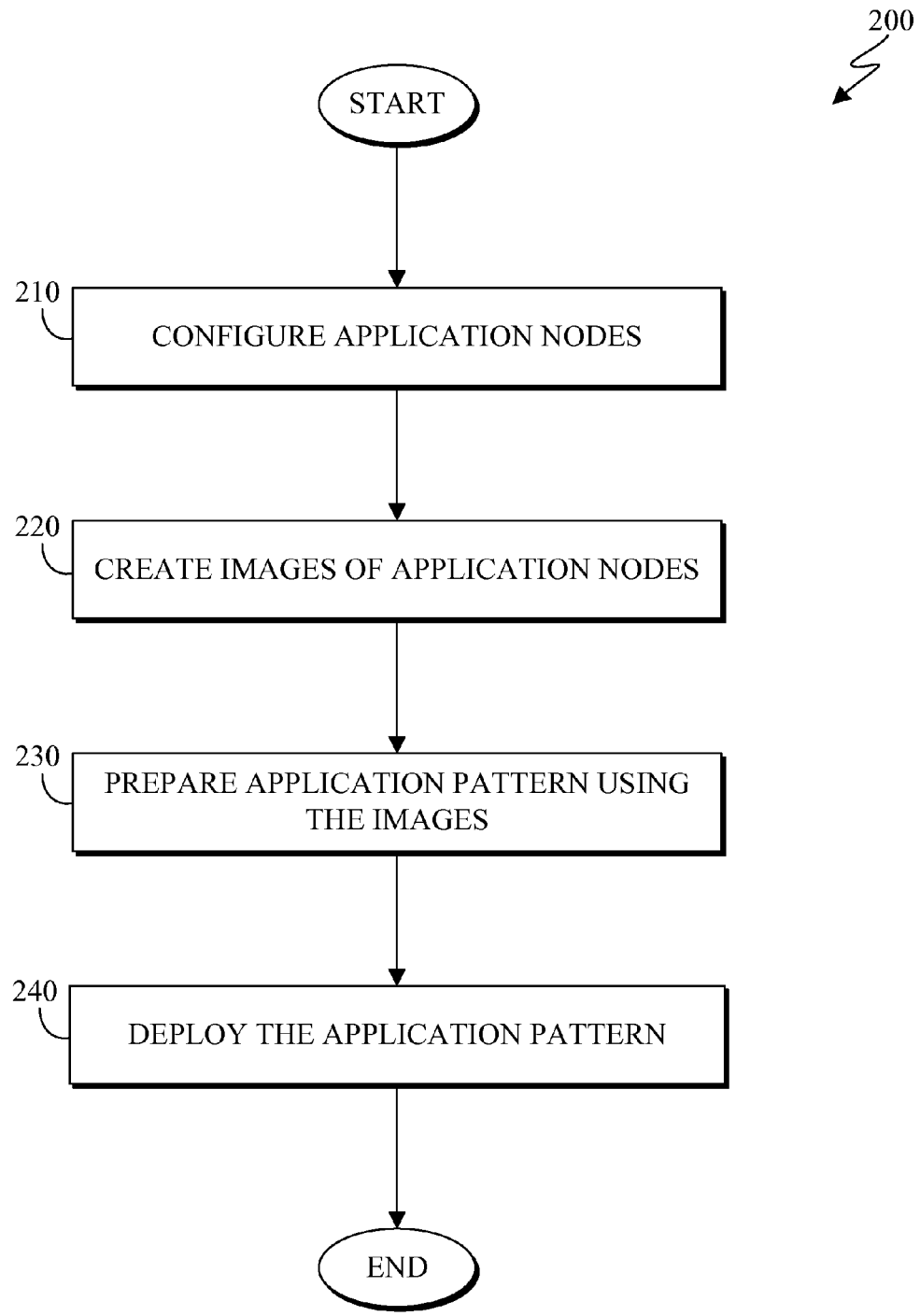
FIG. 2 is a flowchart of one embodiment of a method for deploying applications in accordance with the present invention.

FIG. 2 is a flowchart of one embodiment of an application deployment method 200 in accordance with the present invention. As depicted, the application deployment method 200 includes configuring (210) application nodes, creating (220) images, preparing (230) an application pattern, and deploying (240) the application pattern. Since the application nodes are configured to function collectively prior to capturing images of the nodes, the application may require no further configuration at deployment, greatly reducing the amount of time required to install the application.

Configuring (210) the application nodes may include installing and configuring application nodes 120 such that the nodes 120 cooperatively function as an application. In certain embodiments, the application nodes 120 are installed onto and configured for a cloud platform. The configuration operation 210 may be performed on any platform, architecture, or environment, as long as the application nodes 120 are properly installed and networked with each other. In some embodiments, it is not necessary to perform the configuration operation 210 in the same (or similar) environment in which the application will eventually be deployed.

Creating (220) images of the application nodes may include using image capturing software to take snapshots of the application nodes 120 configured to run as an application. In certain embodiments, one image is created per application node 120. In other embodiments, an image may encompass multiple application nodes 120 or the entire set of nodes 120. Image formats may include QCOW, QCOW2, ISO, IMG, MDS, or the like.

Preparing (230) an application pattern using the images may include compiling all of the images necessary to constitute an application into an application pattern. Each application pattern may thus correspond to a single pre-assembled application that is ready to be deployed. In some embodiments, the application pattern preparation operation 230 is performed automatically or on-the-fly during the image creation operation 220. In certain embodiments, the application pattern is a single deployable file or unit; in other embodiments, the application pattern is a collection of various images that have been associated with each other.

Deploying (240) the application pattern may include transforming the application pattern of images into a swarm of application nodes 120 running as an application. Since the application nodes 120 were already installed and configured before the images were created, the application nodes 120 may function properly without requiring any additional configuration at deployment. In certain embodiments, deployment involves mounting, booting, unpacking, extracting, or otherwise applying the application pattern onto the application nodes 120. The application pattern may be deployed in a cloud environment, and the deployment operation 240 may include creating the application's software defined network 140 inside of a cloud network to avoid network address conflicts. In certain embodiments, deploying (240) the application pattern includes transferring the application pattern or application nodes 120 from one medium to other, i.e., from a USB storage device to a server, etc. During the deployment operation 240, the application nodes 120 may necessitate deployment from their image 310 counterparts in a specific boot order.

Figure 3:
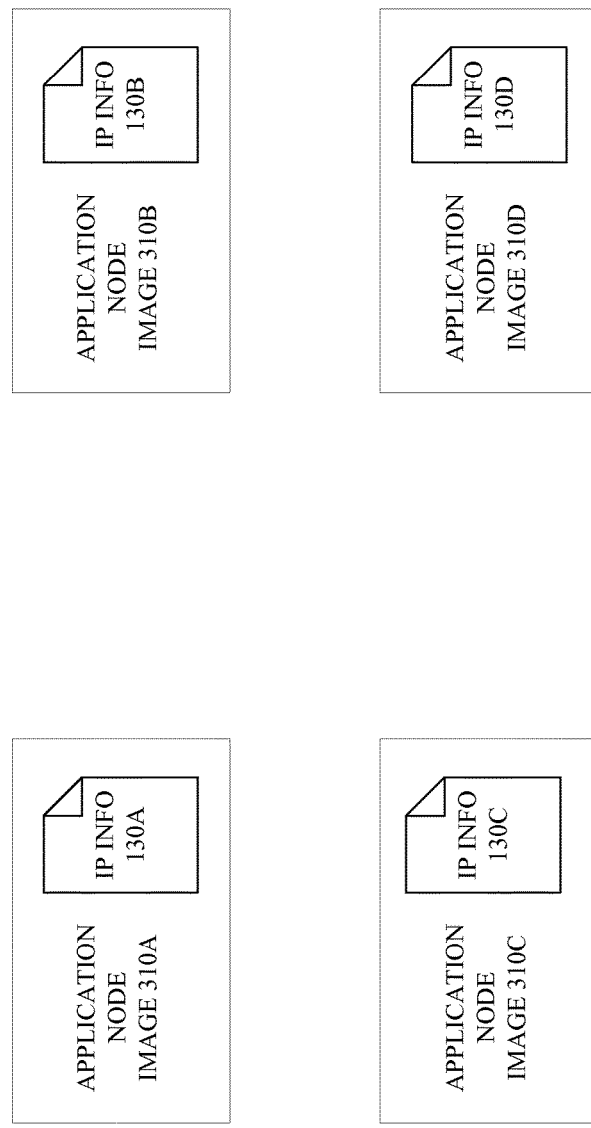
FIG. 3 is a block diagram of one embodiment of application images in accordance with the present invention.

FIG. 3 is a block diagram of one embodiment of an application pattern 300 in accordance with the present invention. As depicted, the application pattern 300 includes application node images 310 (e.g., 310A-310B) and associated IP information 130 (e.g. 130A-130D). The application pattern 300 may represent a static snapshot of the application environment 100 after the nodes 120 have been installed and configured.

The application node images 310 may be snapshots of the application nodes 120 after installation/configuration of the nodes 120. Although the application nodes 310 are represented in FIG. 3 as four discrete images 310a-310d of nodes 120A-120D, alternative embodiments may organize the images 310 together as one single pattern file. In certain embodiments, the images 310 may be deployed into a fully-functioning, previously-configured application, requiring no further configuration at the deployment operation 240. In one embodiment, the application nodes 120 are arranged into a network using static IP addresses and/or isolated virtual networks, so that when the images 310 created from the application nodes 120 are converted back into application nodes 120, there are no network address conflicts regardless of the characteristics of the network on which the application pattern 300 is being deployed. Network address conflicts may also be avoided by employing IP overlap technologies.

Figure 4:
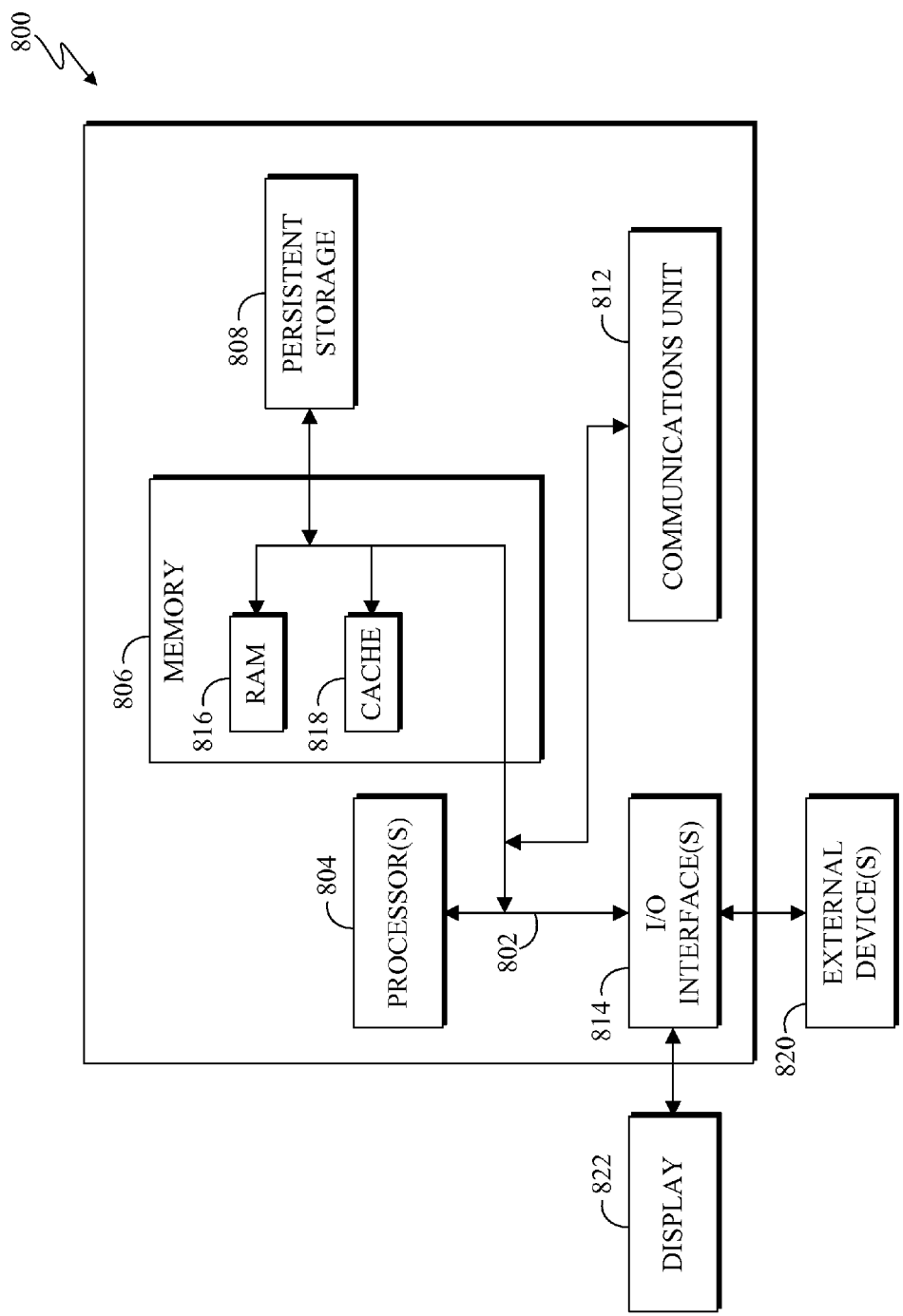
FIG. 4 is a block diagram depicting one example of a computing apparatus (i.e., computer) suitable for executing the methods disclosed herein.

The foregoing methods enable deployment of an application. FIG. 4 is a block diagram depicting components of a computer 400 suitable for executing the methods disclosed herein. The computer 400 may be one embodiment of the application environment 100 depicted in FIG. 1. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
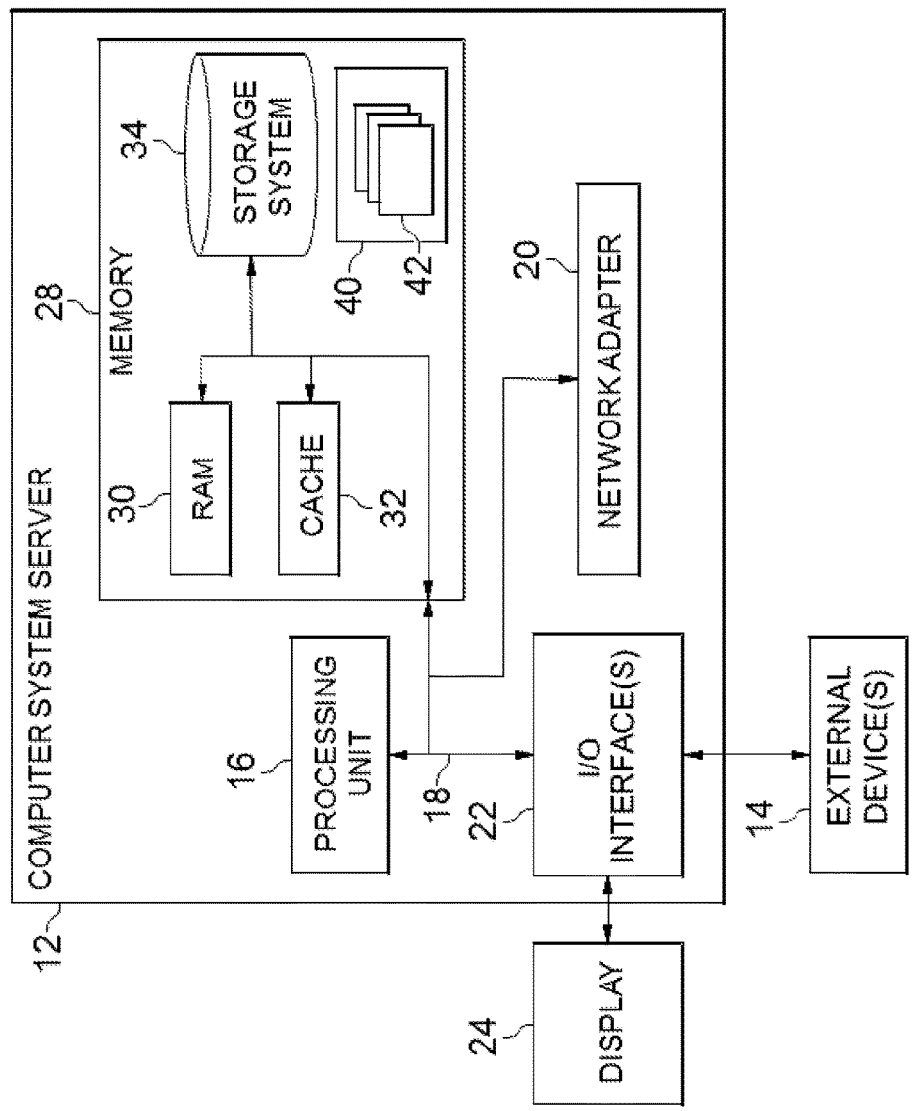
FIG. 5 depicts a cloud computing node according to an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
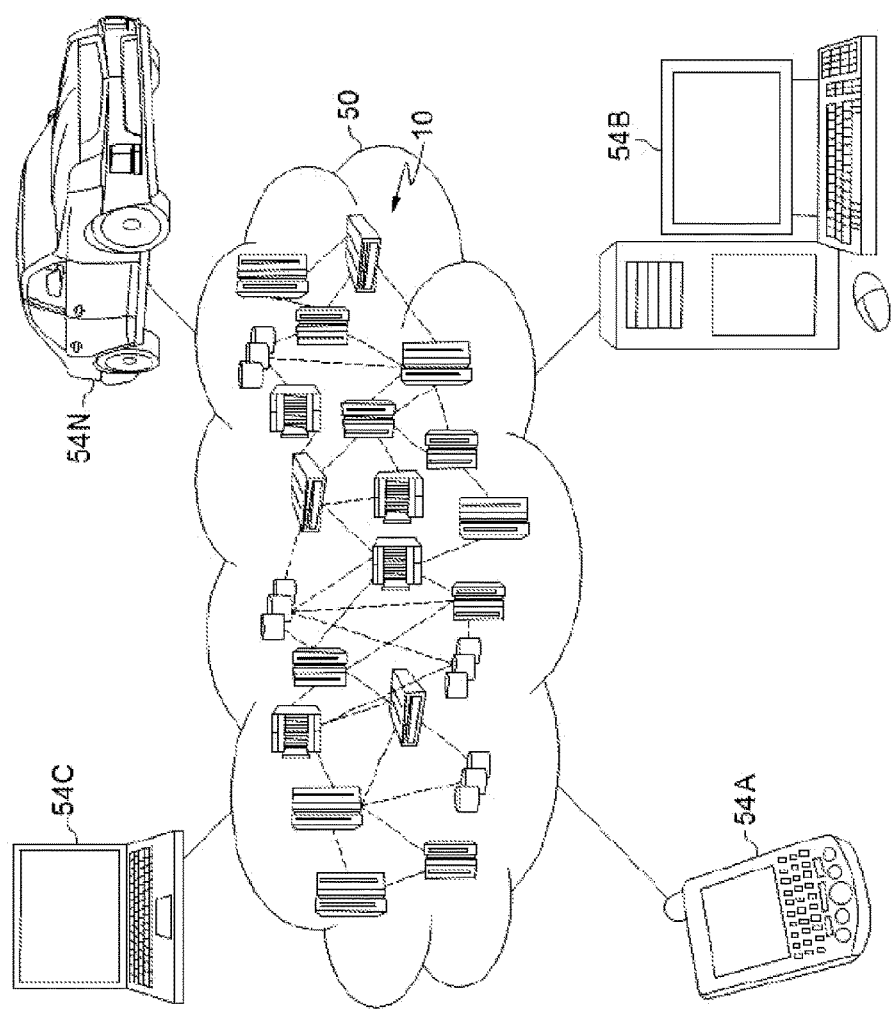
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
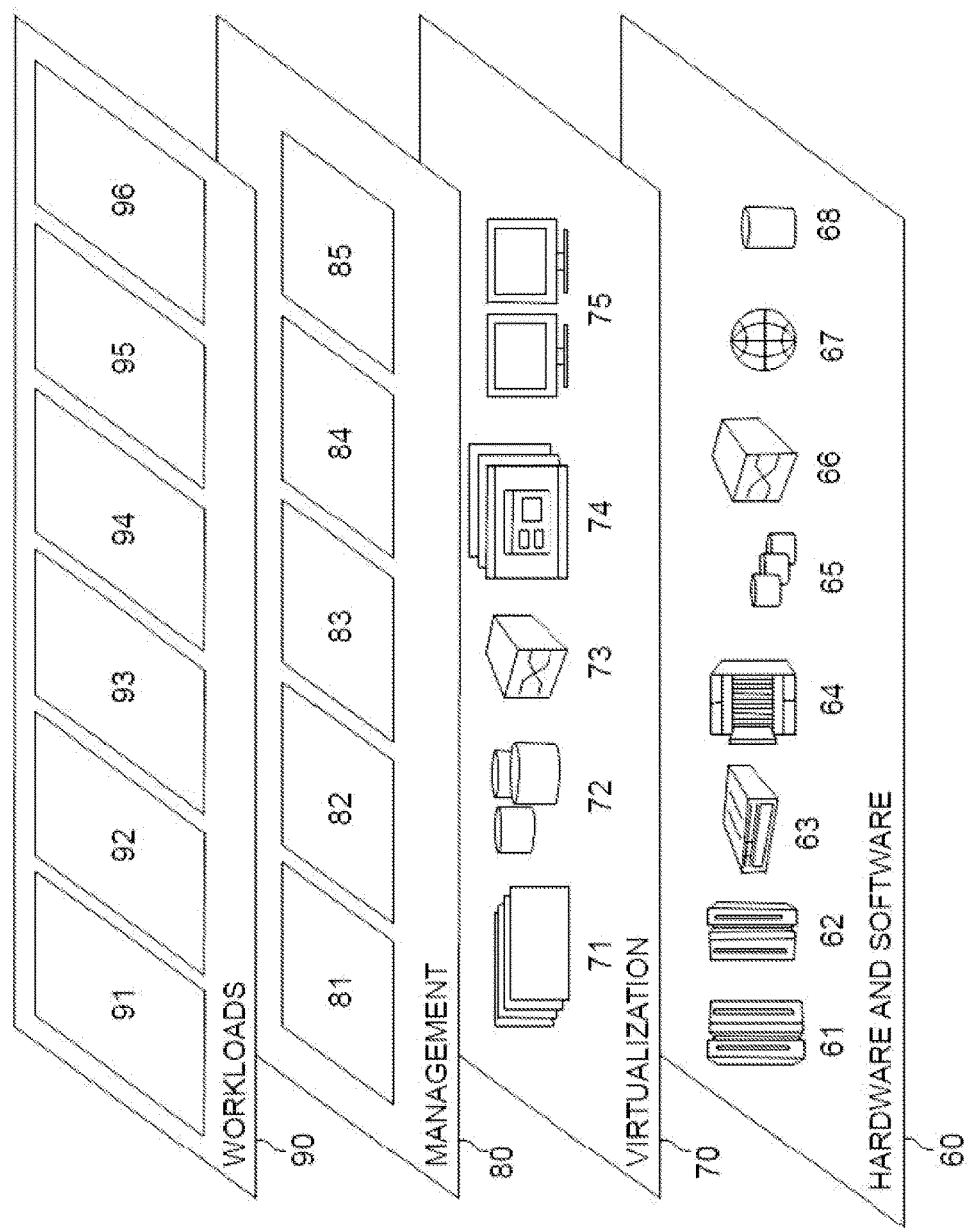
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed enterprise application 96.

What is claimed is:

1. A method of deploying an application, the method comprising:
   configuring a plurality of application nodes corresponding to an application for a software defined network using static IP addresses to produce a plurality of configured application nodes;
   responsive to configuring the plurality of application nodes, capturing a plurality of images corresponding to the plurality of configured application nodes;
   preparing an application pattern that incorporates the plurality of images;
   saving the application pattern for subsequent deployment; and
   deploying the application using the application pattern.

2. The method of claim 1, further comprising executing the application automatically at deployment.

3. The method of claim 1, wherein the software defined network is accessible by one or more service IP addresses.

4. The method of claim 1, wherein at least one application node of the plurality of application nodes conforms to an infrastructure-as-a-service standard.

5. The method of claim 1, wherein at least one application node of the plurality of application nodes runs OpenStack®.

6. The method of claim 1, wherein the software defined network is an isolated virtual network.

7. A computer program product for deploying an application, the computer program product comprising:
   a computer readable storage medium and program instructions stored on the computer readable storage medium, the program instructions comprising instructions to:
   configure a plurality of application nodes corresponding to an application for a software defined network using static IP addresses to produce a plurality of configured application nodes;
   responsive to configuring the plurality of application nodes, capture a plurality of images corresponding to the plurality of configured application nodes;
   prepare an application pattern that incorporates the plurality of images;
   save the application pattern for subsequent deployment; and
   deploy an application using the application pattern.

8. The computer program product of claim 7, further comprising instructions to execute the application automatically at deployment.

9. The computer program product of claim 7, wherein the software defined network is accessible by one or more service IP addresses.

10. The computer program product of claim 7, wherein at least one application node of the plurality of application nodes conforms to an infrastructure-as-a-service standard.

11. The computer program product of claim 7, wherein at least one application node of the plurality of application nodes runs OpenStack®.

12. The computer program product of claim 7, wherein the software defined network is an isolated virtual network.

13. A computer system for deploying an application, the computer system comprising:
   one or more computer processors;
   one or more computer readable storage media;
   program instructions stored therein for execution by at least one of the one or more computer processors, the program instructions comprising instructions to:

configure a plurality of application nodes corresponding to an application for a software defined network using static IP addresses to produce a plurality of configured application nodes;

responsive to configuring the plurality of application nodes, capture a plurality of images corresponding to the plurality of configured application nodes;

prepare an application pattern that incorporates the plurality of images;

save the application pattern for subsequent deployment; and deploy an application using the application pattern.

14. The computer system of claim 13, wherein the software defined network is accessible by one or more service IP addresses.

15. The computer system of claim 13, wherein at least one application node of the plurality of application nodes conforms to an infrastructure-as-a-service standard.

16. The computer system of claim 13, wherein at least one application node of the plurality of application nodes runs OpenStack®.

17. The computer system of claim 13, wherein the software defined network is an isolated virtual network.

* * * * *